United States Patent
Kim et al.

(10) Patent No.: US 10,416,762 B2
(45) Date of Patent: Sep. 17, 2019

(54) BEAM STEERING BACKLIGHT UNIT AND HOLOGRAPHIC DISPLAY APPARATUS INCLUDING THE SAME

(71) Applicant: SAMSUNG ELECTRONICS CO., LTD., Suwon-si (KR)

(72) Inventors: Sunil Kim, Seoul (KR); Hoon Song, Yongin-si (KR); Hongseok Lee, Seoul (KR); Jungkwuen An, Cheonan-si (KR); Chilsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/370,411

(22) Filed: Dec. 6, 2016

(65) Prior Publication Data

US 2018/0024628 A1 Jan. 25, 2018

(30) Foreign Application Priority Data

Jul. 19, 2016 (KR) .......................... 10-2016-0091437

(51) Int. Cl.
*G03H 1/02* (2006.01)
*G06F 3/01* (2006.01)
(Continued)

(52) U.S. Cl.
CPC .............. *G06F 3/013* (2013.01); *F21V 5/007* (2013.01); *F21V 23/003* (2013.01);
(Continued)

(58) Field of Classification Search
None
See application file for complete search history.

(56) References Cited

U.S. PATENT DOCUMENTS 5,132,839 A * 7/1992 Travis .................... H04N 13/32
359/462
6,751,026 B2 6/2004 Tomono
(Continued)

FOREIGN PATENT DOCUMENTS

| KR | 100484174 B1 | 4/2005 |
|---|---|---|
| KR | 1020120063160 A | 6/2012 |
| KR | 1020160030034 A | 3/2016 |

OTHER PUBLICATIONS

Schwerdtner et al: "25.2: Eye-Tracking Solutions for Real-Time Holographic 3-D Display", 2008, SID 08 Digest, pp. 345-347 (3 pages total).

(Continued)

*Primary Examiner* — Brian M Butcher
(74) *Attorney, Agent, or Firm* — Sughrue Mion, PLLC

(57) ABSTRACT

A beam steering backlight unit provides a hologram image to multiple viewing positions and a holographic display apparatus includes the beam steering backlight unit. The backlight unit includes a light source array comprising a plurality of two-dimensionally arranged light sources and a micro lens array arranged to face the light source array and comprising a plurality of two-dimensionally arranged micro lenses. The light source array includes a plurality of light source blocks each corresponding to a respective one of the plurality of micro lenses, wherein a plurality of the light sources are arranged in each of the plurality of light source blocks. The light source array is configured to select and turn on only those light sources of the plurality of light sources respectively disposed in a same position in each of the plurality of light source blocks and turn off the other light sources.

21 Claims, 7 Drawing Sheets

(51) Int. Cl.
*F21V 5/00* (2018.01)
*F21V 23/00* (2015.01)
*G02B 27/01* (2006.01)
*G09G 3/3208* (2016.01)
*G09G 3/34* (2006.01)
*G03H 1/22* (2006.01)
*G02B 3/00* (2006.01)
*F21Y 115/00* (2016.01)
*F21Y 115/15* (2016.01)

(52) U.S. Cl.
CPC ........... *G02B 3/0006* (2013.01); *G02B 27/01* (2013.01); *G02B 27/0103* (2013.01); *G03H 1/02* (2013.01); *G03H 1/2286* (2013.01); *G09G 3/3208* (2013.01); *G09G 3/342* (2013.01); *F21Y 2115/00* (2016.08); *F21Y 2115/15* (2016.08); *G02B 2027/0109* (2013.01); *G02B 2027/0134* (2013.01); *G03H 1/2294* (2013.01); *G03H 2001/0212* (2013.01); *G03H 2001/0224* (2013.01); *G03H 2001/2242* (2013.01); *G03H 2222/34* (2013.01); *G03H 2223/17* (2013.01); *G03H 2223/19* (2013.01); *G03H 2226/05* (2013.01); *G09G 2354/00* (2013.01)

(56) References Cited

U.S. PATENT DOCUMENTS

| | | | |
|---|---|---|---|
| 2007/0188667 A1* | 8/2007 | Schwerdtner | G02B 27/225 349/15 |
| 2009/0213147 A1* | 8/2009 | Sagardoyburu | G02B 27/0093 345/690 |
| 2010/0194854 A1 | 8/2010 | Kroll et al. | |
| 2010/0214634 A1 | 8/2010 | Kroll et al. | |
| 2011/0216407 A1 | 9/2011 | Olaya | |
| 2012/0139908 A1 | 6/2012 | Choi et al. | |
| 2013/0050186 A1* | 2/2013 | Large | H04N 13/0404 345/419 |
| 2014/0300709 A1 | 10/2014 | Futterer et al. | |
| 2015/0228226 A1* | 8/2015 | Luebke | G09G 3/3406 345/690 |

OTHER PUBLICATIONS

Communication dated Dec. 4, 2017, issued by the European Patent Office in counterpart European Application No. 17180098.0.

\* cited by examiner

BEAM STEERING BACKLIGHT UNIT AND HOLOGRAPHIC DISPLAY APPARATUS INCLUDING THE SAME

CROSS-REFERENCE TO RELATED APPLICATION

This application claims priority from Korean Patent Application No. 10-2016-0091437, filed on Jul. 19, 2016, in the Korean Intellectual Property Office, the disclosure of which is incorporated herein in its entirety by reference.

BACKGROUND

1. Field

Apparatuses consistent with exemplary embodiments relate to a backlight unit and a holographic display apparatus including the backlight unit, and more particularly to a beam steering backlight unit providing a hologram image to multiple viewing zones and a holographic display apparatus including the beam steering backlight unit.

2. Description of the Related Art

Methods of displaying 3D images such glasses-type methods and non-glasses-type methods are widely used. Examples of glasses-type methods include deflected glasses-type methods and shutter glasses-type methods, and examples of non-glasses-type methods include lenticular methods and parallax barrier methods. These methods operate according to the principle of binocular parallax, and increasing the number of viewpoints is limited. In addition, these methods may cause viewer fatigue due to the difference between the depth perceived by the brain and the focus of the eyes.

Recently, holographic display methods, which are 3D image display methods capable of making the depth perceived by the brain consistent with the focus of the eyes and of providing full parallax, have been gradually put to practical use. According to a holographic display technique, when reference light is irradiated onto a hologram pattern having recorded thereon an interference pattern obtained by interference between object light reflected from an original object and the reference light, the reference light is diffracted and an image of the original object is reproduced. When a currently commercialized holographic display technique is used, a computer-generated hologram (CGH), rather than a hologram pattern obtained by directly exposing an original object to light, is provided as an electric signal to a spatial light modulator. Then, the spatial light modulator forms a hologram pattern and diffracts reference light according to the input CGH signal, thereby generating a 3D image.

SUMMARY

According to an aspect of an exemplary embodiment, a backlight unit includes: a light source array including a plurality of two-dimensionally arranged light sources; a micro lens array arranged to face the light source array and including a plurality of two-dimensionally arranged micro lenses; and a controller configured to control the plurality of light sources, wherein the light source array includes a plurality of light source blocks, each respectively corresponding to one of the plurality of micro lenses, wherein a plurality of the light sources are arranged in each of the plurality of light source blocks, wherein the light source array is configured such that the plurality of light sources arranged in each of the plurality of light source blocks are independently driven, and wherein the controller is configured to select and turn on only those ones of the plurality of light sources disposed at a respectively same position in each of the plurality of light source blocks and turn off the other light sources.

Each of the plurality of micro lenses may be configured to collimate light incident from the plurality of light sources arranged in a corresponding one of the light source blocks as parallel light.

The plurality of light sources may be coherent light sources that emit coherent light.

The plurality of light sources may be light-emitting diodes (LEDs) or laser diodes (LDs).

The light source array may be an organic light-emitting device (OLED) panel, wherein each pixel of the OLED panel constitutes a single one of the plurality of light sources.

The controller may control and turn on at least two of the plurality of light in each of the plurality of light source blocks and control locations, within each of the plurality of light source blocks, of the at least two light sources that are turned on to be same with respect to each of the plurality of light source blocks.

The backlight unit may further include: an opaque barrier protruding between adjacent ones of the plurality of light source blocks.

A gap between adjacent light source blocks may be greater than a gap between adjacent light sources in each of the plurality of light source blocks.

The controller may store coordinates of the plurality of light sources and coordinates of the plurality of light sources disposed in each of the plurality of light source blocks and may be configured to simultaneously turn on one or more light sources at a respectively same location within each of the plurality of light source blocks based on the coordinates.

The backlight unit may further include: a plurality of horizontal scanning lines and a plurality of vertical scanning lines, wherein each of the plurality of horizontal scanning lines is electrically connected to the light sources arranged along a column in each of the plurality of light source blocks, wherein each of the plurality of vertical scanning lines is electrically connected to the light sources arranged along a row in each of the plurality of light source blocks, and wherein light sources disposed in a respectively same position within each of the plurality of light source blocks are electrically connected to the same horizontal scanning line and the same vertical scanning line as each other.

The number of the plurality of horizontal scanning lines may be the same as the number of columns of the plurality of light sources arranged in each of the light source blocks, and the number of the plurality of vertical scanning lines is the same as the number of rows of the plurality of light sources arranged in each of the light source blocks.

According to an aspect of another exemplary embodiment, a holographic display apparatus includes a spatial light modulator configured to reproduce a hologram image by diffracting incident light; a backlight unit configured to provide light to the spatial light modulator; and a field lens configured to focus the hologram image reproduced by the spatial light modulator on a predetermined space, wherein the backlight unit includes: a light source array including a plurality of two-dimensionally arranged light sources; a micro lens array arranged to face the light source array and including a plurality of two-dimensionally arranged micro lenses; and a controller configured to control the plurality of light sources, wherein the light source array includes a plurality of light source blocks, each respectively corresponding to one of the plurality of micro lenses, wherein a plurality of the light sources are arranged in each of the plurality of light source blocks, wherein the light source array is configured such that the plurality of light sources arranged in each of the plurality of light source blocks are independently driven, wherein the controller is configured to select and turn on only those ones of the plurality of light sources disposed at a respectively same position in each of the plurality of light source blocks and turn off the other light sources, and wherein a location of the hologram image reproduced by the spatial light modulator on the predetermined space varies depending on the positions of the light sources that are turned on in each of the plurality of light source blocks.

The controller may control and turn on at least two of the plurality of light sources in each of the plurality of light source blocks and control locations, within each of the plurality of light source blocks, of the at least two light sources that are turned on to be same with respect to each of the plurality of light source blocks so that the hologram image is provided to at least two different locations on the predetermined space.

The holographic display apparatus may further include: an eye tracker configured to track locations of the observer's pupils.

The controller may select positions of the light sources that are turned on in each of the light source blocks in order to provide the hologram image to the locations of the observer's pupils received from the eye tracker.

According to an aspect of another exemplary embodiment, a heads-up display apparatus includes a spatial light modulator configured to reproduce an image by diffracting incident light; a backlight unit configured to provide light to the spatial light modulator; a field lens configured to focus the image reproduced by the spatial light modulator on a predetermined space; and an eye tracker configured to track locations of the observer's pupils, wherein the backlight unit includes: a light source array including a plurality of two-dimensionally arranged light sources; a micro lens array arranged to face the light source array and including a plurality of two-dimensionally arranged micro lenses; and a controller configured to control the plurality of light sources, wherein the light source array includes a plurality of light source blocks, each respectively corresponding to one of the plurality of micro lenses, wherein a plurality of the light sources are arranged in each of the plurality of light source blocks, wherein the light source array is configured such that each of the plurality of light sources arranged in each of the plurality of light source blocks are independently driven, wherein the controller is configured to select and turn on only those ones of the plurality of light sources at a same respective position in each of the plurality of light source blocks and turn off the other light sources, wherein a location of the image reproduced by the spatial light modulator on the predetermined space varies depending on the respective position of the light sources that are turned on in each of the plurality of light source blocks, and wherein the controller selects positions of the light sources that are turned on in each of the light source blocks in order to provide the image to the locations of the observer's pupils received from the eye tracker.

BRIEF DESCRIPTION OF THE DRAWINGS

These and/or other exemplary aspects and advantages will become apparent and more readily appreciated from the following description of the exemplary embodiments, taken in conjunction with the accompanying drawings in which:

FIG. 3 is a block diagram schematically showing a circuit structure for controlling a plurality of light sources to turn on;

DETAILED DESCRIPTION

Figure 1:
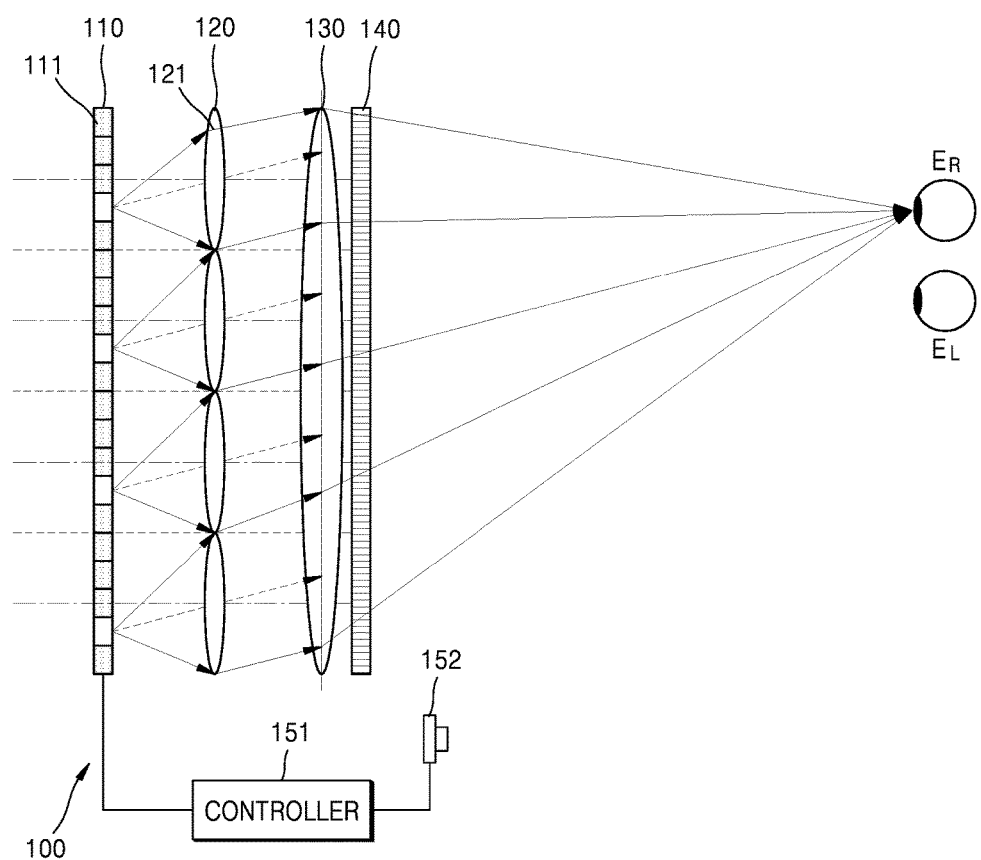
FIG. 1 is a diagram schematically showing structures of a beam steering backlight unit and a holographic display apparatus according to an exemplary embodiment.

Hereinafter, with reference to the accompanying drawings, a beam steering backlight unit and a holographic display apparatus including the beam steering backlight unit will be described in detail. Like reference numerals refer to like elements throughout, and in the drawings, sizes of elements may be exaggerated for clarity and convenience of explanation. The exemplary embodiments described below are merely exemplary, and various modifications may be possible. In a layered structure described below, an expression "above" or "on" may include not only "immediately on in a contact manner" but also "on in a non-contact manner".

FIG. 1 is a diagram schematically showing structures of a beam steering backlight unit and a holographic display apparatus 100 according to an exemplary embodiment. Referring to FIG. 1, the holographic display apparatus 100 may include a light source array 110 having a plurality of two-dimensionally (2D) arranged light sources 111, a micro lens array 120 having a plurality of two-dimensionally arranged micro lenses 121, a controller 151 that drives the plurality of light sources 111, a spatial light modulator 140 that diffracts incident light and reproduces a hologram image, and a field lens 130 that focuses light. The field lens 130 is disposed between the micro lens array 120 and the spatial light modulator 140 in FIG. 1. However, the location of the field lens 130 is not limited thereto. For example, the field lens 130 may be disposed in front of the spatial light modulator 140, i.e., between an observer and the spatial light modulator 140, and thus, the field lens may focus the hologram image formed by the spatial light modulator 140.

The spatial light modulator 140 may form a hologram pattern which diffracts and modulates incident light according to a hologram signal provided by an image signal processor (not shown). The spatial light modulator 140 may use a phase modulator for performing phase modulation and an amplitude modulator for performing amplitude modulation, or may use a complex modulator for performing both phase modulation and amplitude modulation. Although the spatial light modulator 140 of FIG. 1 is a transmissive spatial light modulator, a reflective spatial light modulator may also be used. A transmissive spatial light modulator may comprise, for example, a semiconductor modulator based on a compound semiconductor such as GaAs or a liquid crystal device (LCD). A reflective spatial light modulator may comprise, for example, a digital micromirror device (DMD), a liquid crystal on silicon (LCoS), or a semiconductor modulator.

In the elements of FIG. 1, the light source array 110, the micro lens array 120, and the controller 151 may together configure a backlight unit that provides light to the spatial light modulator 140. As noted above, the light source array 110 may include a plurality of two-dimensionally arranged light sources 111. The light sources 111 may be coherent light sources that emit coherent light. To provide light having high coherence, for example, laser diodes (LD) may be used as light sources 111. However, if light has a certain degree of spatial coherence, since the light may be sufficiently diffracted and modulated by the spatial light modulator 140, for example, light-emitting diodes (LEDs) may be used as the light sources 111. In addition to LEDs, any other light sources may be used as the light sources 111 as long as light having spatial coherence is emitted. For example, an organic light-emitting device (OLED) panel may be used as the light sources 111. In this case, each pixel of the OLED panel may constitute a single light source 111.

The micro lens array 120 may be arranged to face the light source array 110 in parallel thereto and may include the plurality of two-dimensionally arranged micro lenses 121. As shown in FIG. 1, the light sources 111 may have smaller diameters than the micro lenses 121 and may be arranged with respect to the single micro lens 121. Although FIG. 1 illustrates a row of five light sources 111 corresponding to each one of the micros lenses 121, this is merely an example. According to design, a greater or smaller number of light sources 111 may be arranged to correspond with each single micro lens 121.

A set of the plurality of light sources 111 that are arranged to face a single micro lens 121 is referred to as a "light source block" below. The light source array 110 may include a plurality of light source blocks. For example, the light source array 110 may include a number of light source blocks equal to the number of micro lenses 121. Thus, the light source blocks may respectively correspond to the plurality of micro lenses 121. The plurality of light sources 111 may be two dimensionally arranged within each of the light source blocks.

Each of the micro lenses 121 may collimate light emitted from the light sources 111 included in the light source block corresponding to the micro lens 121 and may provide the thus output parallel light to the field lens 130. Thereafter, the field lens 130 may focus the parallel light. Since locations of the plurality of light sources 111 within a single light source block are different from one another, the light emitted from the plurality of light sources 111 of a single light source block may be focused onto different focal points on a focal plane of the field lens 130. The micro lens 121 and the field lens 130 may focus light such that light emitted from light sources 111 in the same respective positions within each of the light source blocks, may be focused onto the same focal point on the focal plane of the field lens 130. While the field lens 130 focuses the parallel light, the spatial light modulator 140 may diffract the parallel light and reproduce a hologram image. Thus, a location at which the hologram image is formed may be different depending on locations of the plurality of light sources 111 that are turned on in the single light source block. As many viewpoints as the number of light sources 111 arranged in each of the light source blocks may be provided. In this regard, the backlight unit configured by the light source array 110, the micro lens array 120, and the controller 151 may be the beam steering backlight unit that controls a travel direction of light.

According to the present exemplary embodiment, the light source array 110 may be configured such that each of the plurality of light sources 111 included in each of the light source blocks is independently driven. For example, the light source array 110 may be configured such that, within a given light source block, only some of the plurality of light sources 111 are selectively turned on and the others are turned off. The controller 151 may select and turn on only those light sources 111 disposed at the same location in each of the plurality of light source blocks and turn off the other light sources 111. Thus, a location on which the hologram image reproduced by the spatial light modulator 140 is displayed may vary depending on locations of the light sources 111 that are turned on in each of the light source blocks. Thus, it is possible to control the location at which the hologram image is displayed by selecting and turning on specific light sources 111 in each of the light source blocks.

Figure 2:
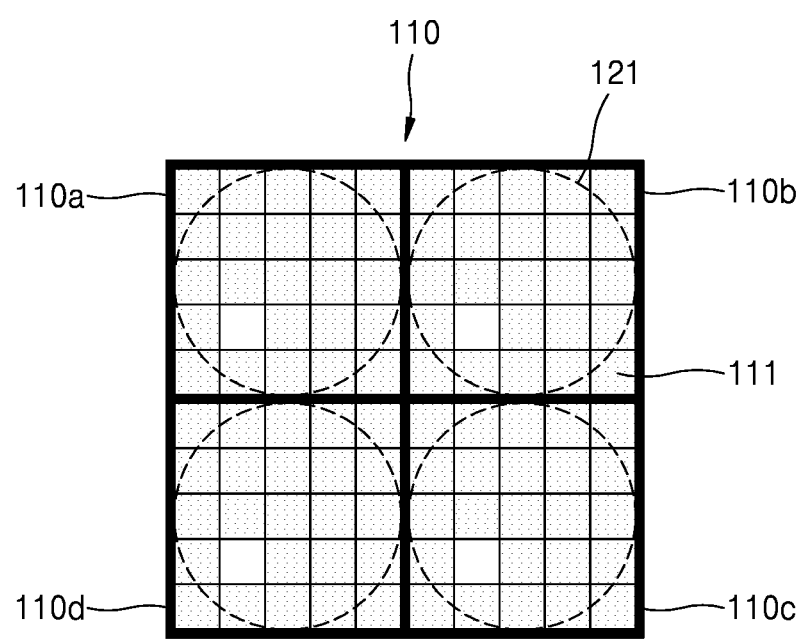
FIG. 2 is a plan view for describing an operation method of a light source array of the holographic display apparatus of FIG. 1.

For example, FIG. 2 is a plan view for describing an operation method of the light source array 110 of the holographic display apparatus 100 of FIG. 1. Referring to FIG. 2, a plurality of light source blocks 110a, 100b, 110c, and 110d are be two-dimensionally arranged in the plurality of micro lenses 121 respectively, and a plurality of light sources 111 may be two-dimensionally arranged in each of the light source blocks 110a, 100b, 110c, and 110d. Although the micro lenses 121 and the light source blocks 110a, 100b, 110c, and 110d are arranged in a 2×2 arrangement in FIG. 2, a much greater number of micro lenses 121 and light source blocks may be actually arranged. Although the light sources 111 are arranged in a 5×5 arrangement in each of the light source blocks 110a, 100b, 110c, and 110d in FIG. 2, this is merely an example. The number of light sources 111 arranged in each of the light source blocks 110a, 100b, 110c, and 110d may vary depending on diameters of the micro lenses 121 and the light sources 111 and may be selected in accordance with the number of viewpoints that are to be implemented. The numbers of horizontal rows and vertical columns of the light sources 111 arranged in each of the light source blocks 110a, 100b, 110c, and 110d may be different.

As shown in FIG. 2, in each of the light source blocks 110a, 100b, 110c, and 110d, only one of the light sources 111 may be turned on and the others may be turned off. Among the light sources 111 arranged in each of the light source blocks 110a, 100b, 110c, and 110d, only the light sources 111 respectively located at the same position within the light source blocks may be turned on and the others may be turned off. In this way, a hologram image may be reproduced on the focal plane of the field lens 130 at locations respectively corresponding to the light sources 111 that are turned on. To this end, the controller 115 may determine the locations at which the hologram image is to be reproduced and select and turn on the light sources 111 corresponding to the desired locations.

To turn on the light sources 111 as described above, each of the light sources 111 included in the light source array 110 may be independently driven. In this case, the controller 151 may store coordinates of each of the plurality of light source blocks 110a, 100b, 110c, and 110d and coordinates of each of the light sources 111 arranged in each of the plurality of light source blocks 110a, 100b, 110c, and 110d. The controller 151 may simultaneously turn on the light sources 111 respectively located at the same position within of the light source blocks 110a, 100b, 110c, and 110d based on the stored coordinates.

Figure 3:
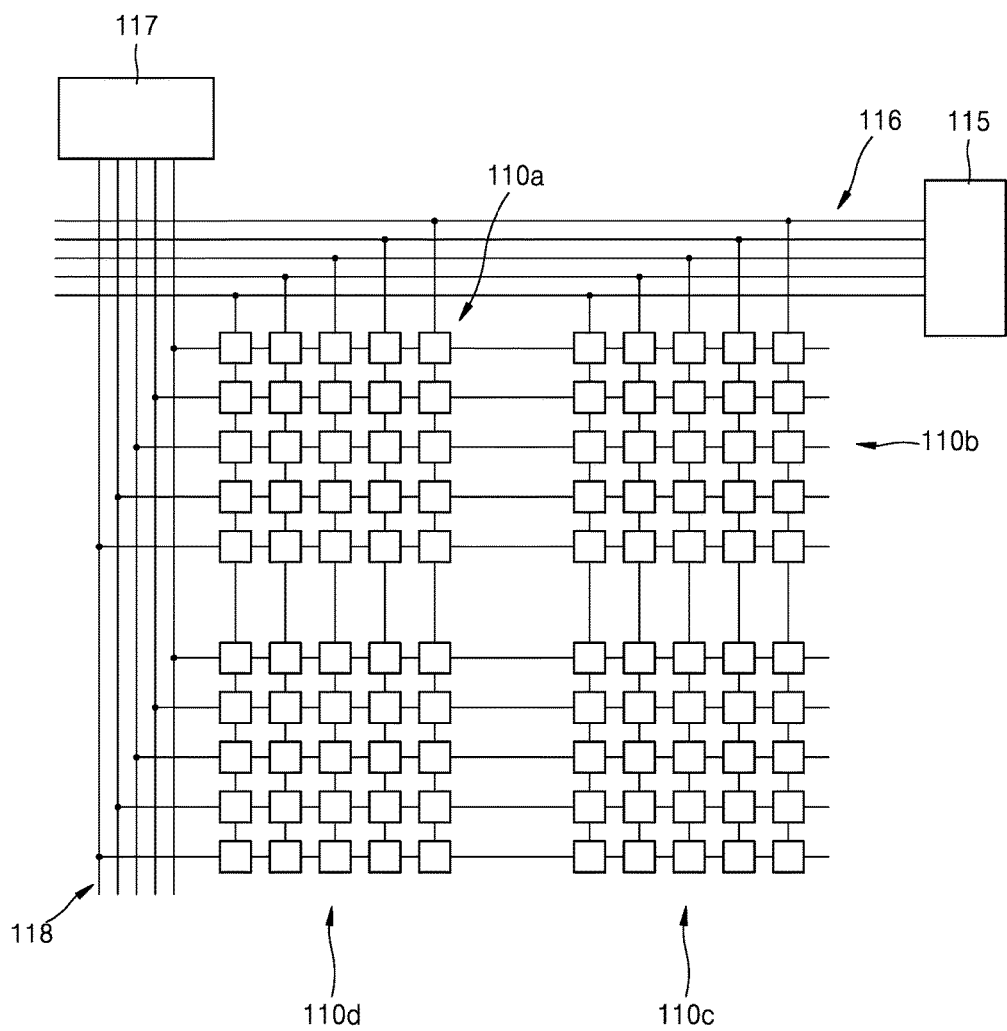

Alternately, the light source array 110 may be configured such that the light sources 111 respectively located at the same position within each of the light source blocks 110a, 100b, 110c, and 110d are electrically connected to each other, and thereby may be controlled together. For example, FIG. 3 is a block diagram schematically showing a circuit structure which enables the controller to control the plurality of light sources 111 which are turned on. Referring to FIG. 3, the light source array 110 may include a horizontal scanning driver 115, a plurality of horizontal scanning lines 116 connected to the horizontal scanning driver 115, a vertical scanning driver 117, and a plurality of vertical scanning lines 118 connected to the vertical scanning driver 117. Each of the horizontal scanning lines 116 may be electrically connected to only those light sources 111 arranged in columns of each of the light source blocks 110a, 100b, 110c, and 110d, respectively corresponding to each other. Each of the vertical scanning lines 118 may be electrically connected to only those light sources 111 arranged in rows of each of the light source blocks 110a, 100b, 110c, and 110d, respectively corresponding to each other. To this end, the number of horizontal scanning lines 116 may be the same as the number of columns of light sources 111 arranged in each of the light source blocks 110a, 100b, 110c, and 110d, and the number of vertical scanning lines 118 may be the same as the number of rows of light sources 111 arranged in each of the light source blocks 110a, 100b, 110c, and 110d.

For example, when the light sources 111 are disposed in a 5×5 arrangement in each of the light source blocks 110a, 100b, 110c, and 110d, the light source array 110 may include five horizontal scanning lines 116 and five vertical scanning lines 118. The first horizontal scanning line 116 may be electrically connected to the light sources 111 arranged in the first columns of each of the light source blocks 110a, 100b, 110c, and 110d. The second horizontal scanning line 116 may be electrically connected to the light sources 111 arranged in the second columns of each of the light source blocks 110a, 100b, 110c, and 110d. The first vertical scanning line 118 may be electrically connected to the light sources 111 arranged in the first rows of each of the light source blocks 110a, 100b, 110c, and 110d. The second vertical scanning line 118 may be electrically connected to the light sources 111 arranged in the second rows of each of the light source blocks 110a, 100b, 110c, and 110d. In this way, each of the light sources 111 may be connected to one of the horizontal scanning lines 116 and one of the vertical scanning lines 118 corresponding to the row and column in which the light source 111 is located in one of the light source blocks 110a, 100b, 110c, and 110d.

Therefore, the light sources 111 respectfully located at the same position within the light source blocks 110a, 100b, 110c, and 110d may be electrically connected to a same horizontal scanning line 116 and a same vertical scanning line 118. In this case, each of the light sources 111 is not independently driven, but is driven in conjunction with each other light source located in a same row and column of one of the light source blocks 110a, 100b, 110c, and 110d. For example, if the horizontal scanning driver 115 provides a signal to the first horizontal scanning line 116 and the vertical scanning driver 117 provides a signal to the first vertical scanning line 118, all the light sources 111 located at a position (1, 1) in one of the light source blocks 110a, 100b, 110c, and 110d may be turned on. Thus, an addressing process used by the controller 151 to control the light source array 110 may be easy to perform.

In this way, a hologram image may be reproduced at a desired location on a focal plane of the field lens 130 by selecting and turning on one or more specific light sources 111 included in the light source array 110. For example, the holographic display apparatus 100 may provide the hologram image at locations corresponding to the observer's pupils. To this end, the holographic display apparatus 100 may further include an eye tracker 152 that tracks the locations of the observer's pupils. The eye tracker 152 may obtain an image of an observer through a camera, etc., detect the observer's pupils from the image, and analyze the locations of the observer's pupils. The eye tracker 152 may track changes in the locations of the observer's pupils in real time and provide a result of the tracking to the controller 151. Then, the controller 151 may change the location of the light source(s) 111 that is turned on in each of the light source blocks 110a, 100b, 110c, and 110d in response to the change in the locations of the observer's pupils received from the eye tracker 152. In other words, the controller 151 may turn on one or more light sources 111 in each of the light source blocks 110a, 100b, 110c, and 110d corresponding to the locations of the observer's pupils on the focal plane of the field lens 130.

Figure 4:
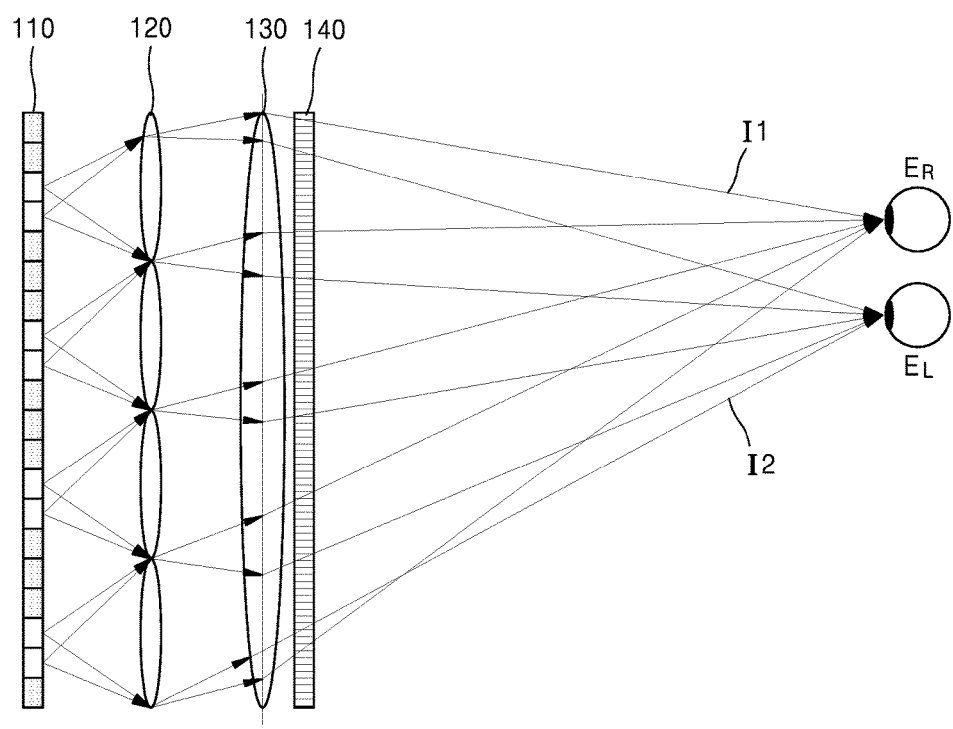
FIG. 4 is a diagram schematically showing structures of a beam steering backlight unit and a holographic display apparatus according to another exemplary embodiment.
Figure 5:
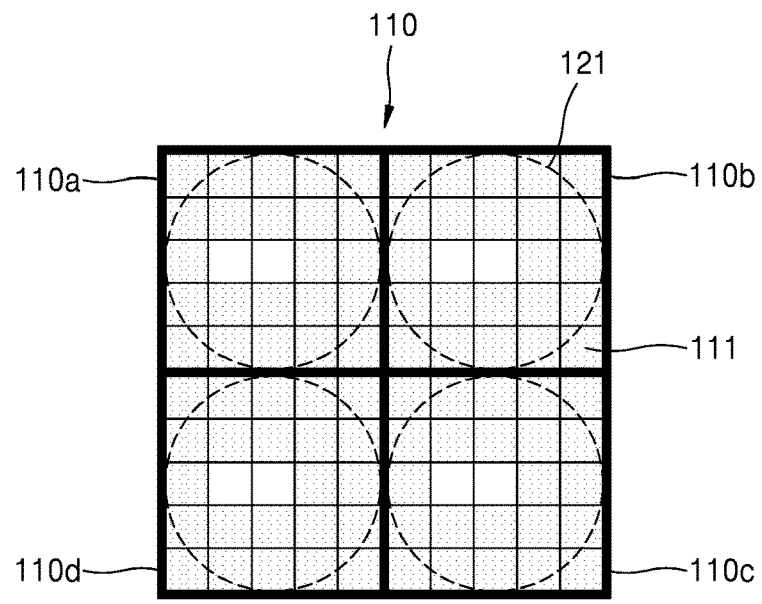
FIG. 5 is a plan view for describing an operation method of a light source array of the structure of FIG. 4.

In FIGS. 1 and 2, only a single light source 111 is turned on in each of the light source blocks 110a, 100b, 110c, and 110d. However, the present disclosure is not limited thereto. For example, FIG. 4 is a diagram schematically showing structures of a beam steering backlight unit and the holographic display apparatus 100 according to another exemplary embodiment, and FIG. 5 is a plan view for describing an operation method of the light source array 110 of the structure of FIG. 4. As shown in FIGS. 4 and 5, the controller 151 may simultaneously turn on at least two light sources 111 in each of the light source blocks 110a, 100b, 110c, and 110d. In this regard, locations of the light sources 111 that are turned on may be the same with respect to each of the light source blocks 110a, 100b, 110c, and 110d. For example, the light sources 111 located at (3, 2) and (3, 3) may be turned on and others may be turned off in each of the light source blocks 110a, 100b, 110c, and 110d.

Then, the holographic display apparatus 100 may simultaneously provide hologram images to at least two locations on a focal plane of the field lens 130. For example, the holographic display apparatus 100 may simultaneously provide hologram images I1 and I2 having different viewpoints to an observer's right eye ER and an observer's left eye EL, respectively, by using a binocular hologram method. That is, the holographic display apparatus 100 may provide the left eye hologram image I1 to the observer's right eye ER and the right eye hologram image I2 having a different viewpoint from that of the left eye hologram image I1 to the observer's left eye EL. The left eye hologram image I1 and the right eye hologram image I2 provided by the holographic display apparatus 100 may solely provide a 3D effect to the observer and have only different viewpoints, unlike a right eye image and a left eye image of a stereoscopic method. The stereoscopic method may provide the 3D effect by using a binocular parallax when the observer's right and left eyes respectively recognize a 2D right eye image and a 2D left eye image having different viewpoints. Thus, the stereoscopic method may not generate a 3D effect from only one of the right eye image and the left eye image and may make the observer feel tired due to a difference between depth perceived by the brain and a focus of the eyes. However, the holographic display apparatus 100 may respectively form the left eye hologram image I1 and the right eye hologram image I2 on locations on a predetermined space, i.e., a right eye ER viewing zone and a left eye EL viewing zone of the observer, thereby making the depth perceived by the brain consistent with the focus of the eyes and providing full parallax.

The holographic display apparatus 100 may provide a hologram image to each of a plurality of adjacent observers by simultaneously turning on at least two light sources 111 in each of the light source blocks 110a, 100b, 110c, and 110d. The two light sources 111 are turned on in each of the light source blocks 110a, 100b, 110c, and 110d in FIGS. 4 and 5 but this is merely an example. Locations of the light sources 11 that are turned on are merely examples. The number and locations of the light sources 111 that are turned on in each of the light source blocks 110a, 100b, 110c, and 110d may vary depending on the number of hologram images that are to be simultaneously provided and reproduction locations of the hologram images.

Figure 6:
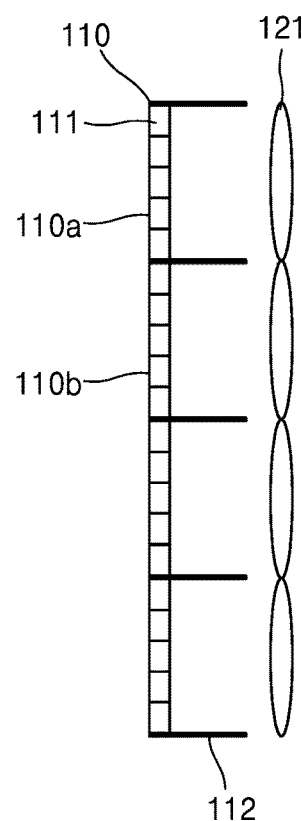
FIG. 6 is a diagram schematically showing a structure of a beam steering backlight unit according to another exemplary embodiment.

FIG. 6 is a diagram schematically showing a structure of a beam steering backlight unit according to another exemplary embodiment. Referring to FIG. 6, the light source array 110 may further include an opaque barrier 112 that protrudes between the light source blocks 110a, 100b, 110c, and 110d that are adjacent to each other. Light emitted from the light sources 111 that are arranged along an edge of each of the light source blocks 110a, 100b, 110c, and 110d may be incident into the micro lens 121 that is adjacent to the other micro lens 121 corresponding to each of the light source blocks 110a, 100b, 110c, and 110d. In this case, crosstalk, causing an additional hologram image to be reproduced at an unwanted location, may occur. The barrier 112 may prevent the light emitted from the light sources 111 that are arranged along the edge of each of the light source blocks 110a, 100b, 110c, and 110d from being incident into the micro lens 121 that is adjacent to the other micro lens 121 corresponding to each of the light source blocks 110a, 100b, 110c, and 110d, thereby preventing the crosstalk from occurring.

Figure 7:
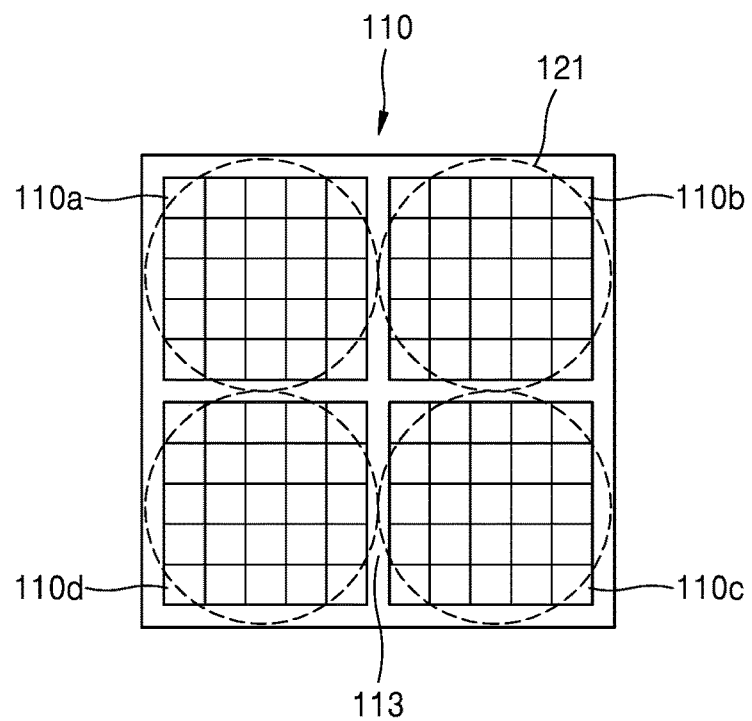
FIG. 7 is a diagram schematically showing a structure of a beam steering backlight unit according to another exemplary embodiment.

FIG. 7 is a diagram schematically showing a structure of a beam steering backlight unit according to another exemplary embodiment. Referring to FIG. 7, the light source array 110 may further include a spacer region 113 between the light source blocks 110a, 100b, 110c, and 110d that are adjacent to each other. The spacer region 113 may prevent light emitted from the light sources 111 that are arranged along an edge of each of the light source blocks 110a, 100b, 110c, and 110d from being incident into the micro lens 121 that is adjacent to the other micro lens 121 corresponding to each of the light source blocks 110a, 100b, 110c, and 110d by providing gaps between the light source blocks 110a, 100b, 110c, and 110d that are adjacent to each other. A width of the spacer region 113 may be greater than gaps between the light sources 111 that are adjacent to each other in each of the light source blocks 110a, 100b, 110c, and 110d. In particular, the spacer region 113 may have a sufficiently large width such that the light emitted from the light sources 111 that are arranged along an edge of each of the light source blocks 110a, 100b, 110c, and 110d is not incident into the micro lens 121 that is adjacent to the other micro lens 121 corresponding to each of the light source blocks 110a, 100b, 110c, and 110d.

Figure 8:
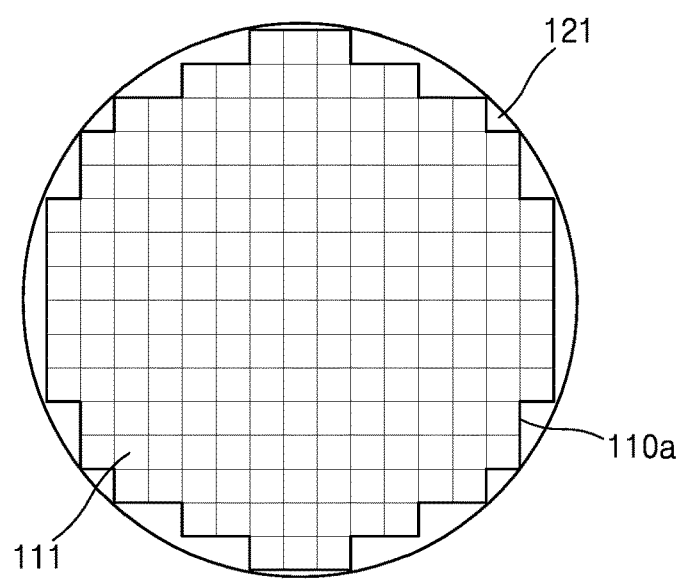
FIG. 8 is a diagram schematically showing a structure of a beam steering backlight unit according to another exemplary embodiment.

The light sources 111 are two-dimensionally arranged in a rectangular region in each of the light source blocks 110a, 100b, 110c, and 110d in FIGS. 2, 5, and 7 but the present disclosure is not necessarily limited thereto. For example, FIG. 8 is a diagram schematically showing a structure of a beam steering backlight unit according to another exemplary embodiment. Referring to FIG. 8, the light sources 111 may be arranged only in a region that overlaps with the micro lens 121 corresponding to each of the light sources 111 in each of the light source blocks 110a, 100b, 110c, and 110d. For example, the light sources 111 may be two-dimensionally arranged in a circular region such that the light sources 111 do not escape from the micro lens 121 corresponding to each of the light sources 111. Then, a crosstalk may be prevented since light emitted from the light sources 111 that are arranged along an edge of each of the light source blocks 110a, 100b, 110c, and 110d is not incident into the micro lens 121 that is adjacent to the other micro lens 121 corresponding to each of the light source blocks 110a, 100b, 110c, and 110d.

Figure 9:
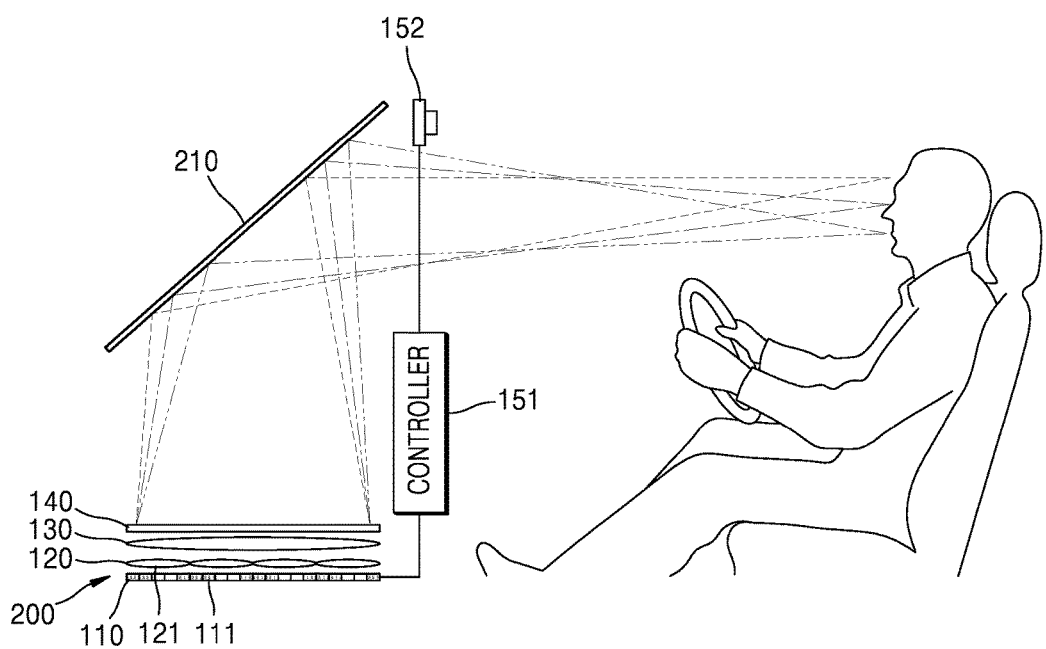
FIG. 9 is a diagram schematically showing structures of a beam steering backlight unit and a heads-up display apparatus according to another exemplary embodiment.

The holographic display apparatus 100 including the above-described beam steering backlight unit may be used as, for example, a vehicle heads-up display apparatus. For example, FIG. 9 is a diagram schematically showing structures of a beam steering backlight unit and a heads-up display apparatus 200 according to another exemplary embodiment. Referring to FIG. 9, the heads-up display apparatus 200 may include the light source array 110 having the plurality of two-dimensionally arranged light sources 111, the micro lens array 120 having the plurality of two-dimensionally arranged micro lenses 121, the controller 151 that drives the plurality of light sources 111, the spatial light modulator 140 that diffracts incident light and reproduces an image, the field lens 130 that focuses the image reproduced by the spatial light modulator 140 on a predetermined space, and an eye tracker 152 that tracks locations of a driver's pupils. In this regard, the light source array 110, the micro lens array 120, and the controller 151 may configure the beam steering backlight unit that provides light to the spatial light modulator 140. A structure and a function of the heads-up display apparatus 200 of FIG. 9 are the same as those of the holographic display apparatus 100 of FIGS. 1 through 8, and thus detailed descriptions thereof are omitted.

The heads-up display apparatus 200 may be mounted, for example, on a dashboard of a vehicle and display a video including vehicle state information, vehicle drive information, navigation information, etc. to a driver. Although the image reproduced by the spatial light modulator 140 may be directly provided to the driver, alternately, the image may be provided to the driver by being reflected through, for example, front glass 210 of the vehicle. The eye tracker 152 may be mounted on a ceiling portion of an interior of the vehicle that may be seen by the driver. The eye tracker 152 may continuously monitor locations of driver's pupils and provide the locations of the driver's pupils to the controller 151. Then, the controller 151 may provide the video to the locations of driver's pupils in response to the locations of driver's pupils received from the eye tracker 152. For example, the controller 151 may select locations of the light sources 111 that are turned on corresponding to the locations of driver's pupils and may turn on the light sources 111 located in the selected locations in each of the light source blocks 110a, 100b, 110c, and 110d.

To facilitate understanding of the present disclosure, the exemplary embodiments of a beam steering backlight unit and a holographic display apparatus including the beam steering backlight unit have been described and shown in the accompanying drawings. However, it should be understood that such embodiments are merely intended to illustrate the present disclosure and not to limit the present disclosure. It should be also understood that the present disclosure is not limited to the illustrated and provided description. This is because various modifications may be made by those of ordinary skill in the art.

What is claimed is:

1. A backlight unit comprising:
a light source array comprising a plurality of two-dimensionally arranged light sources;
a micro lens array comprising a plurality of two-dimensionally arranged micro lenses; and
a controller configured to control the plurality of light sources,
wherein the light source array comprises a plurality of light source blocks, wherein each of the plurality of light source blocks respectively corresponds to one of the plurality of micro lenses, and wherein each of the plurality of light source blocks comprises a plurality of the light sources,
wherein each of the plurality of light sources arranged in each of the plurality of light source blocks is independently driven and is configured to thereby independently generate light,
wherein the controller is configured to select and turn on only a subset of light sources and turn off light sources other than the subset of light sources, wherein each of the subset of light sources is disposed at a same respective position within each of the plurality of light source blocks,
wherein each of the plurality of light source blocks comprises at least four light sources which are two-dimensionally arranged in each of the plurality of light source blocks,
wherein the backlight unit further comprises a plurality of horizontal scanning lines and a plurality of vertical scanning lines,
wherein each of the plurality of horizontal scanning lines is electrically connected to the light sources arranged in a respective column in each of the plurality of light source blocks,
wherein each of the plurality of vertical scanning lines is electrically connected to the light sources arranged in a respective row in each of the plurality of light source blocks, and
wherein the subset of light sources are electrically connected to a same horizontal scanning line and a same vertical scanning line.

2. The backlight unit of claim 1, wherein each of the plurality of micro lenses is configured to collimate light incident from the plurality of light sources arranged in a respective one of the plurality of light source blocks.

3. The backlight unit of claim 1, wherein the plurality of light sources are coherent light sources that each generate and emit coherent light.

4. The backlight unit of claim 3, wherein the plurality of light sources are light-emitting diodes (LEDs) or laser diodes (LDs).

5. The backlight unit of claim 1, wherein the light source array comprises an organic light-emitting device (OLED) panel,
wherein each pixel of the OLED panel is a single light source of the plurality of light sources.

6. The backlight unit of claim 1, wherein the subset of light sources comprises at least two light sources of each of the plurality of light source blocks, wherein the at least two light sources are disposed at same respective positions in each of the plurality of light source blocks.

7. The backlight unit of claim 1, further comprising: an opaque barrier protruding between adjacent ones of the plurality of light source blocks.

8. The backlight unit of claim 1, wherein a gap between adjacent ones of the light source blocks is greater than a gap between adjacent ones of the light sources within each of the plurality of light source blocks.

9. A backlight unit comprising:
a light source array comprising a plurality of two-dimensionally arranged light sources;
a micro lens array comprising a plurality of two-dimensionally arranged micro lenses; and
a controller configured to control the plurality of light sources,
wherein the light source array comprises a plurality of light source blocks, wherein each of the plurality of light source blocks respectively corresponds to one of the plurality of micro lenses, and wherein each of the plurality of light source blocks comprises a plurality of the light sources,
wherein the light source array is configured such that each of the plurality of light sources arranged in each of the plurality of light source blocks is independently driven,
wherein the controller is configured to select and turn on only a subset of light sources and turn off light sources other than the subset of light sources, wherein each of the subset of light sources is disposed at a same respective position within each of the plurality of light source blocks, and
wherein the controller stores coordinates of the plurality of light sources and coordinates of the plurality of light sources arranged in each of the plurality of light source blocks and is configured to simultaneously turn on the subset of light sources based on the coordinates.

10. The backlight unit of claim 1, wherein a number of the plurality of horizontal scanning lines is the same as a number of columns of the plurality of light sources arranged in each of the light source blocks, and a number of the plurality of vertical scanning lines is the same as a number of rows of the plurality of light sources arranged in each of the light source blocks.

11. A holographic display apparatus comprising:
a spatial light modulator configured to reproduce a hologram image by diffracting incident light;
a backlight unit configured to provide light to the spatial light modulator; and
a field lens configured to focus the hologram image reproduced by the spatial light modulator on a predetermined space,
wherein the backlight unit comprises:
a light source array comprising a plurality of two-dimensionally arranged light sources;
a micro lens array comprising a plurality of two-dimensionally arranged micro lenses; and
a controller configured to control the plurality of light sources,
wherein the light source array comprises a plurality of light source blocks, wherein each of the plurality of light source blocks respectively corresponds to one of the plurality of micro lenses, and wherein each of the plurality of light source blocks comprises a plurality of the light sources,
wherein each of the plurality of light sources arranged in each of the plurality of light source blocks is independently driven and is configured to thereby independently generate light, wherein the controller is configured to select and turn on only a subset of light sources and turn off light sources other than the subset of light sources, wherein each of the subset of light sources is disposed at a same respective position within each of the plurality of light source blocks, wherein a location of the hologram image reproduced by the spatial light modulator on the predetermined space varies depending on the respective position of the light sources of the subset in each of the plurality of light source blocks, wherein each of the plurality of light source blocks comprises at least four light sources which are two-dimensionally arranged in each of the plurality of light source blocks, wherein the backlight unit further comprises a plurality of horizontal scanning lines and a plurality of vertical scanning lines, wherein each of the plurality of horizontal scanning lines is electrically connected to the light sources arranged in a respective column in each of the plurality of light source blocks, wherein each of the plurality of vertical scanning lines is electrically connected to the light sources arranged in a respective row in each of the plurality of light source blocks, and wherein the subset of light sources are electrically connected to a same horizontal scanning line and a same vertical scanning line.

12. The holographic display apparatus of claim 11, wherein each of the plurality of micro lenses is configured to collimate light incident from the plurality of light sources arranged in a respective one of the plurality of light source blocks.

13. The holographic display apparatus of claim 11, wherein the plurality of light sources are coherent light sources that each generate and emit coherent light.

14. A holographic display apparatus comprising:
a spatial light modulator configured to reproduce a hologram image by diffracting incident light;
a backlight unit configured to provide light to the spatial light modulator; and
a field lens configured to focus the hologram image reproduced by the spatial light modulator on a predetermined space,
wherein the backlight unit comprises:
a light source array comprising a plurality of two-dimensionally arranged light sources;
a micro lens array comprising a plurality of two-dimensionally arranged micro lenses; and
a controller configured to control the plurality of light sources,
wherein the light source array comprises a plurality of light source blocks, wherein each of the plurality of light source blocks respectively corresponds to one of the plurality of micro lenses, and wherein each of the plurality of light source blocks comprises a plurality of the light sources,
wherein each of the plurality of light sources arranged in each of the plurality of light source blocks is independently driven and is configured to thereby independently generate light,
wherein the controller is configured to select and turn on only a subset of light sources and turn off light sources other than the subset of light sources, wherein each of the subset of light sources is disposed at a same respective position within each of the plurality of light source blocks, wherein a location of the hologram image reproduced by the spatial light modulator on the predetermined space varies depending on the respective position of the light sources of the subset in each of the plurality of light source blocks, wherein each of the plurality of light source blocks comprises at least four light sources which are two-dimensionally arranged in each of the plurality of light source blocks, and wherein the controller stores coordinates of the plurality of light sources and coordinates of the plurality of light sources arranged in each of the plurality of light source blocks and is configured to simultaneously turn on the subset of light sources based on the coordinates.

15. The holographic display apparatus of claim 11, wherein a number of the plurality of horizontal scanning lines is the same as a number of columns of the plurality of light sources arranged in each of the light source blocks, and a number of the plurality of vertical scanning lines is the same as a number of rows of the plurality of light sources arranged in each of the light source blocks.

16. The holographic display apparatus of claim 11, wherein the subset of light sources comprises at least two light sources of each of the plurality of light source blocks, wherein the at least two light sources are disposed as same respective positions in each of the plurality of light source blocks so that the hologram image is provided to at least two different locations on the predetermined space.

17. The holographic display apparatus of claim 11, further comprising: an opaque barrier protruding between adjacent ones of the plurality of light source blocks.

18. The holographic display apparatus of claim 11, wherein a gap between adjacent ones of the light source blocks is greater than a gap between adjacent ones of the light sources within each of the plurality of light source blocks.

19. The holographic display apparatus of claim 11, further comprising: an eye tracker configured to track locations of an observer's pupils.

20. The holographic display apparatus of claim 19, wherein the controller selects positions of the light sources in the subset in order to provide the hologram image to the locations of the observer's pupils received from the eye tracker.

21. A heads-up display apparatus comprising:
a spatial light modulator configured to reproduce an image by diffracting incident light;
a backlight unit configured to provide light to the spatial light modulator;
a field lens configured to focus the image reproduced by the spatial light modulator on a predetermined space; and
an eye tracker configured to track locations of an observer's pupils,
wherein the backlight unit comprises:
a light source array comprising a plurality of two-dimensionally arranged light sources;
a micro lens array comprising a plurality of two-dimensionally arranged micro lenses; and
a controller configured to control the plurality of light sources,
wherein the light source array comprises a plurality of light source blocks, wherein each of the plurality of light source blocks respectively corresponds to one of the plurality of micro lenses, and wherein each of the plurality of light source blocks comprises a plurality of the light sources, wherein each of the plurality of light sources arranged in each of the plurality of light source blocks is independently driven and is configured to thereby independently generate light, wherein the controller is configured to select and turn on only a subset of light sources and turn off light sources other than the subset of light sources, wherein each of the subset of light sources is disposed at a same respective position within each of the plurality of light source blocks, wherein a location of the image reproduced by the spatial light modulator on the predetermined space varies depending on the respective positions of the light sources of the subset, wherein the controller selects the respective positions of the light sources of the subset in order to provide the image to the locations of the observer's pupils received from the eye tracker, wherein each of the plurality of light source blocks comprises at least four light sources which are two-dimensionally arranged in each of the plurality of light source blocks, wherein the backlight unit further comprises a plurality of horizontal scanning lines and a plurality of vertical scanning lines, wherein each of the plurality of horizontal scanning lines is electrically connected to the light sources arranged in a respective column in each of the plurality of light source blocks, wherein each of the plurality of vertical scanning lines is electrically connected to the light sources arranged in a respective row in each of the plurality of light source blocks, and wherein the subset of light sources are electrically connected to a same horizontal scanning line and a same vertical scanning line.

* * * * *